I. A. Salmon,

Dentist's Tool Rack.

No. 3,832. Reissued Feb. 8. 1870.

Witnesses.
S. N. Pepper
J. R. Snow

Ira A. Salmon.
by his attorney.
R. Mott

N. PETERS, PHOTO-LITHOGRAPHER, WASHINGTON, D. C.

United States Patent Office.

IRA A. SALMON, OF BOSTON, MASSACHUSETTS.

*Letters Patent No.* 62,368, *dated February* 26, 1867; *reissue No.* 3,832, *dated February* 8, 1870.

IMPROVEMENT IN DENTISTS' TOOL-RACKS.

The Schedule referred to in these Letters Patent and making part of the same.

*To all persons to whom these presents may come:*

Whereas, Letters Patent No. 62,368, dated February 26, 1867, have been granted to the undersigned, IRA A. SALMON, of Boston, in the county of Suffolk, and State of Massachusetts, for an invention having reference to Dentists' Tool-Racks, and Tools therefor; and, whereas, I, the said SALMON, have petitioned to the Commissioner of Patents for leave to surrender such Letters Patent for reissue:

Now, therefore, I do hereby declare the said invention to be fully described in the following specification, and represented in the accompanying drawings, of which—

Figure 1 is a top view of the tool-rack, to be hereinafter described.

Figure 2, a transverse section of it, such section being taken on a line from *a* to *b* of fig. 1.

The rack consists of a tray or cushioned platform, and a series of wedge or chisel-shaped projections or teeth, between or upon which, and preparatory to, or after having been used, the tools belonging to a dental mallet are to be placed and supported, the same being so that each of them may be readily detached from the stock of the mallet by one or two of such teeth, and retained or held thereby in a convenient position for being again inserted in or coupled with the stock, as circumstances may require. To this end each of the tools has to be of a peculiar construction, that is to say, it has to be formed with a hole through its shank, or with one or more notches therein, as represented in the accompanying drawings, particularly in figs. 5 and 6, the first of such figures being a top view of the tool shown in fig. 2, and the second being a top view of the tool shown in fig. 4.

Figure 1:
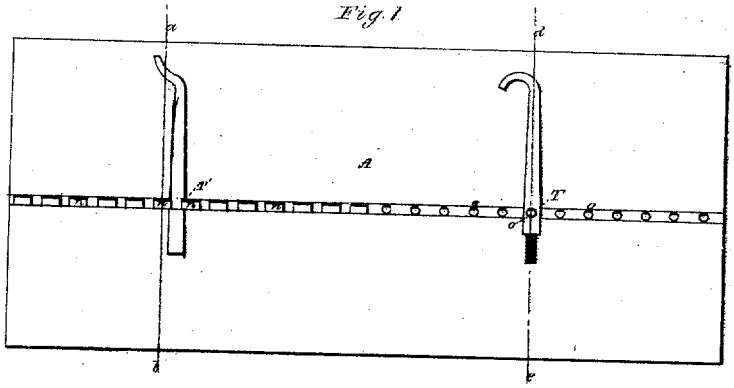
Figure 3:
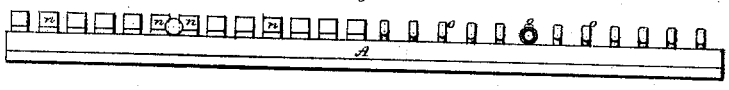
Figure 3 is a side elevation of such rack.

These tools are also exhibited in fig. 1, in their places, one being held by two of the teeth, and the other by one of them.

The tray or platform, or base A of the tool-rack shown in the drawings, has its upper surface sloped in opposite directions from its middle, or thereabouts, where there is imbedded in the platform the lower part of a rack, whose teeth or projections, *n o*, rise above the platform, and each have a wedge or chisel-shape, as represented, such being for reasons to be hereinafter explained.

With a dental mallet, it is necessary to have a set of pluggers of various forms, which, during the process of plugging a tooth, require occasionally or frequently to be changed in the mallet, that is, one to be removed therefrom, and another to be substituted in the place of the one so removed.

The tool-rack and the tools, constructed with the holes or notches in them, as described, furnish a ready means of detaching a tool from the stock of the mallet, and of sustaining the tool in a position for being again inserted in the stock, as occasion may require.

The shank of each tool or plugger may be provided with a simple tenon, to enter a corresponding socket in the stock of the mallet, the rack affording means for removing from the stock a tool made in either of the ways as described.

The shank of the tool may have a notch or notches made in it, the arrangement of the hole, or the notch or notches, being so that the hole, (or notch, or each of the notches, when there are two of them,) when the shank is in the mallet-stock socket, shall enter partly into the socket, a portion of the hole or notch being extended beyond the socket.

In order to effect the ready detachment of the tool from the socket, the hole is to be slipped upon one of the chisel-shaped or bevelled pins or teeth *o*, and the mallet is to be pressed downward, so as to cause the pin to act as a wedge or lever, in a manner to pry or force the tooth from its socket, whose outer end will serve as a fulcrum to aid in effecting the necessary leverage, or as an abutment to support the wedge of the tooth, in the effort to disengage the tool or plugger from the socket.

Figure 4:
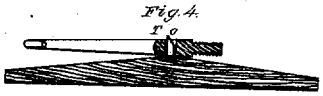
Figure 4 is a transverse section of the rack, the plane of such section being through *d e* of fig. 1.

The tool thus removed will be left on the rack-pin in the position as shown at T, in figs. 1 and 4.

Figure 2:
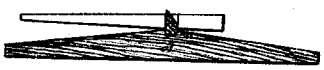
Figure 5:
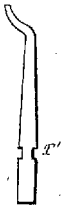
Figure 6:
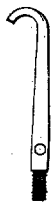

In a similar manner the tool, when notched as shown at T', in figs. 1 and 5, may be detached from the mallet-stock by means of two of the wedge teeth, *n n*, and left between them in the position as shown in figs. 1 and 2.

I make no claim either to the tool-rack or the tool, as represented in the United States Patent No. 54,882, the rack shown in such patent having no wedged or chisel-shaped teeth to operate in manner with a tool or plugger, as do those of my rack.

With the tool-rack shown in such patent, the detachment of the tool from the socket of the mallet has to be effected by a direct pull, twist, or draught on the mallet, which, to a dentist, while at work, is a serious inconvenience, and requires the tool-rack to be fastened or held down to the table or stand on which it may rest.

With my improvement, a simple downward pressure on the mallet will suffice to effect the detaching of a tool by the rack. The direction of pressure being vertically, or thereabouts, the rack will not be liable to be displaced on the table, and will require no fastening to hold it thereon.

It will thus be seen that my rack contains features or elements not incident to the rack described in the aforesaid patent, such not only causing it to operate differently, but imparting to it advantages not possessed by the other.

I would observe that the instrument rack may have its teeth made of steel, or metal pins, bevelled on one side, or made wedge-shaped, where they project above the base or part A.

I claim a tool or plugger-rack, or instrument rack, made with its teeth wedge-shaped or bevelled, substantially in the manner and for the purpose, and for use, as described, whether such teeth be pins inserted in the base-plate of the rack, or be projections extended from a plate or bar fixed in such base.

Also, a tool or plugger made with a hole, so arranged in its shank, as described, as to adapt it to operate with the mallet and bevelled tooth of the rack, in manner substantially as hereinbefore explained.

I. A. SALMON.

Witnesses:
R. H. EDDY,
A. G. EDDY,